June 5, 1945.  L. R. FISH ET AL  2,377,770
OIL AND GREASE DEFLECTOR
Filed Feb. 3, 1943  2 Sheets-Sheet 1
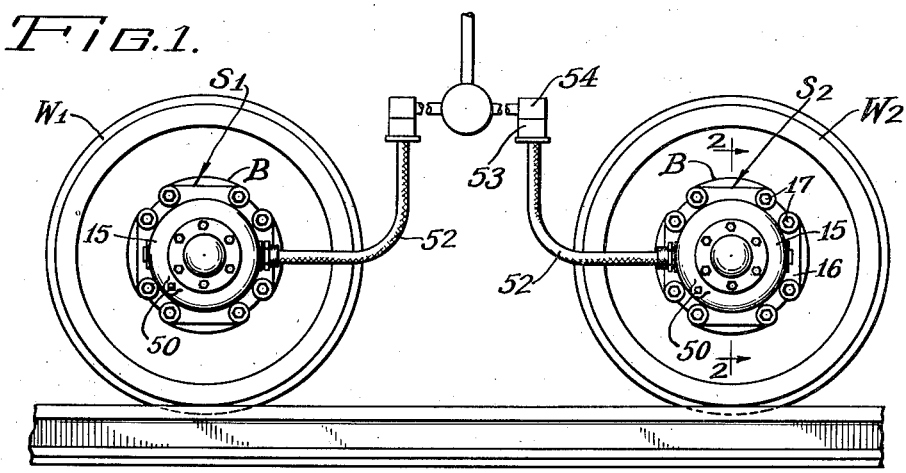
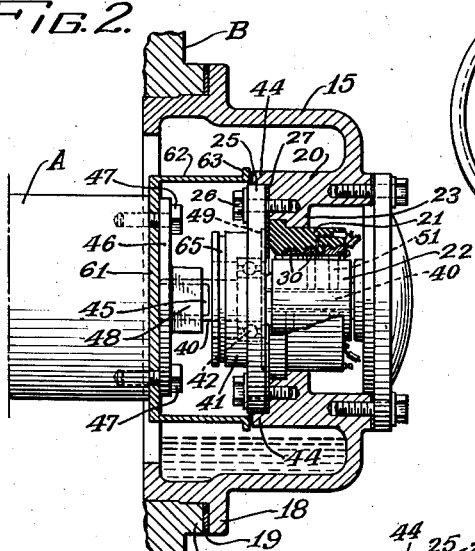
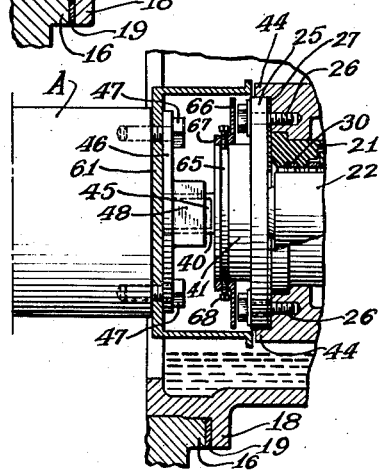
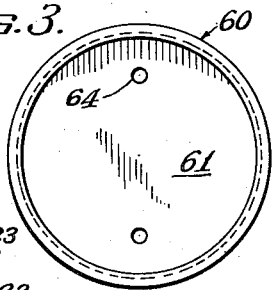
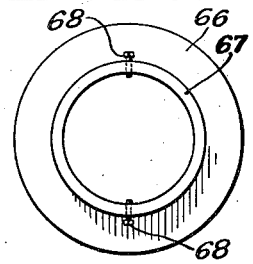
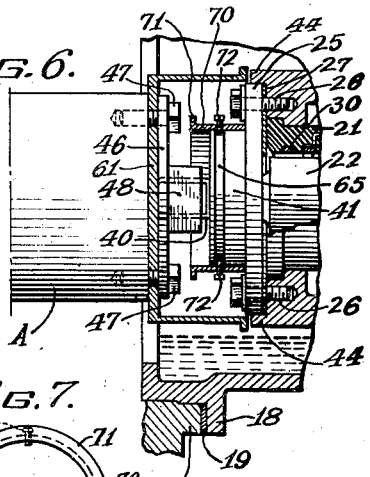
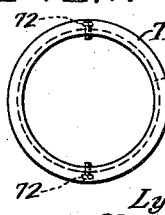
Inventors
Lyall R. Fish
Clarence F. Wiegman
By Wallace and Connor
Attorneys June 5, 1945.   L. R. FISH ET AL   2,377,770
OIL AND GREASE DEFLECTOR
Filed Feb. 3, 1943   2 Sheets-Sheet 2
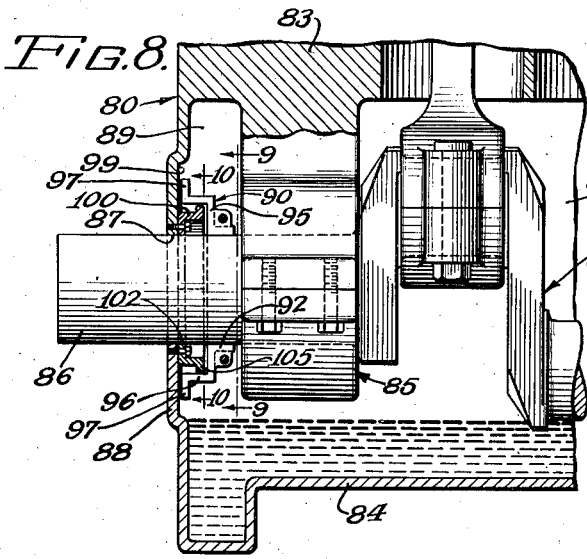
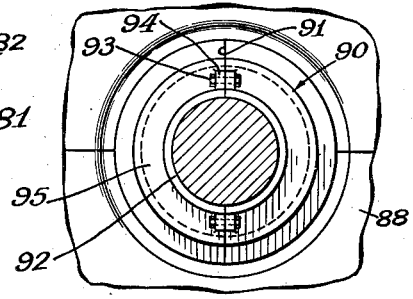
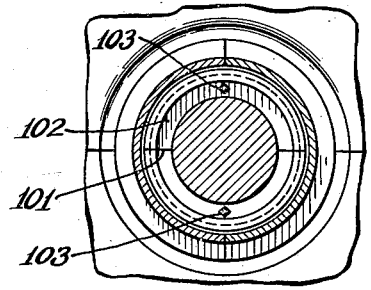
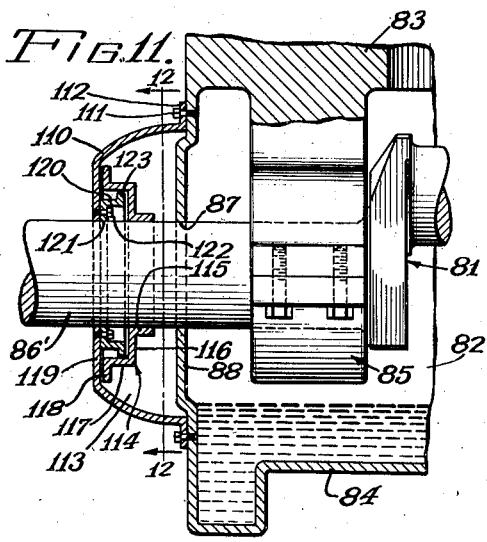
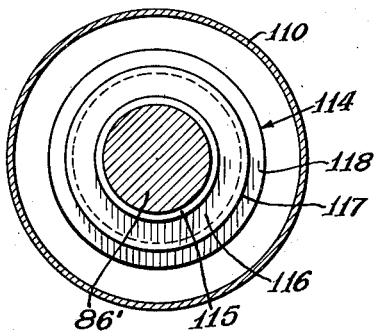
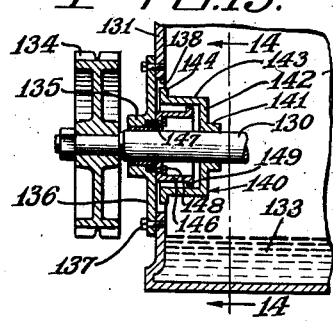
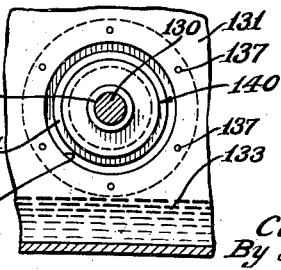
Inventors:
Lyall R. Fish
Clarence F. Wiegman
By Wallace and Cannon
Attorneys Patented June 5, 1945

2,377,770

UNITED STATES PATENT OFFICE 2,377,770

OIL AND GREASE DEFLECTOR

Lyall R. Fish and Clarence F. Wiegman, Minneapolis, Minn.

Application February 3, 1943, Serial No. 474,538

2 Claims. (Cl. 286—5)

This invention relates to oil and grease deflectors and particularly to such deflectors which are effective to prevent undesired passage of lubricant or the like along a rotating shaft or the like.

Where one portion of a rotating shaft requires lubrication it is usually desirable to confine the oil and grease to that particular portion of the shaft in order to avoid waste of lubricant or to prevent the oil and grease from injuring mechanism or parts which are associated with other portions of the shaft. It is recognized that oil-tight bearing or packing means may in many instances serve to prevent flow of the lubricant along the shaft, but such expedients have been found to be unsatisfactory in many instances. Thus it has been found that the effectiveness of grease retainers or oil-tight packing devices is frequently lost where varying conditions of use, such as widely varying temperatures, are encountered. Another instance of unsatisfactory operation of such grease retainers has been found where the apparatus in which the rotatable shaft is employed is of such a nature that it may be continuously operated for relatively protracted periods but which may also remain idle for relatively protracted periods, those parts of the apparatus which are associated with the rotating shaft and which are to be protected against having the lubricant come into contact therewith need to be protected both in instances where the apparatus operates continuously for relatively protracted periods and also in those instances where the apparatus is idle or at rest.

In view of the foregoing it is an important object of this invention to enable flow of lubricant along a shaft to be prevented under all of the varying conditions encountered in use, and particularly under those conditions hereinabove set forth. Objects related to the foregoing are to accomplish this by so locating the parts which are to be kept free of lubricant when the apparatus is at rest, that such parts are well spaced above the sump or the like in which the lubricant is stored and also by locating the parts in such a location that lubricant which comes into contact with the means effective to protect such parts may drain therefrom back into the sump or the like during rest intervals in the course of use of the apparatus; to interpose, between the parts of the shaft that are to be protected against having a lubricant come into contact therewith and those elements of an associated or related apparatus that are to have a lubricant come into contact therewith, an arrangement which will be effective to deflect the lubricant away from the parts that are to be protected against having the lubricant come into contact therewith; to associate a protecting device with a movable element of the apparatus and to so arrange such a device that it will be effective during the course of movement thereof to deflect a lubricant away from parts to be protected against having a lubricant or the like to come into contact therewith; to so form a protecting device of the aforesaid character that a lubricant or the like passing into contact therewith during movement thereof will be deflected back to the source of the lubricant; and to insure that lubricant or the like passing to a protecting device of the aforesaid character will so drain therefrom when such a device is at rest that the lubricant or the like will be prevented from passing to those parts that are to be protected by the protecting device.

One particularly difficult situation involving the control or prevention of flow of lubricant along a shaft is found in connection with control apparatus having operating elements associated with one or more wheels of railway or like equipment. The elements so associated with one or more of the wheels of the equipment may constitute all or merely a part of detecting means operable to sense an operating condition with respect to which it is desired to effect a control operation as, for example, an incipient wheel sliding condition, such detecting means being operative to initiate a control operation which, in the instance of detection of an incipient wheel sliding condition during a braking operation, may be a release or reduction in effectiveness of the braking means or it may be a sanding operation to increase the adhesion between a wheel and the rail on which it rolls or the control operation may be a combination of such operations.

One particularly satisfactory arrangement for detecting means of the aforesaid character has been to associate such a detecting means with a journal box for the axle of a wheel or the like, the operative condition of which is to be determinative of the functioning of the detecting means. In such arrangements, however, it is necessary that the operative parts of the detecting means be so protected that a lubricant or the like contained within the journal box will be prevented from passing thereto and this is particularly true where the detecting means includes a commutator switch or switches, electrical generator means, inertia operated switch means or the like and to enable this desirable end to be realized in a novel and efficient manner is among the important objects of our invention.

Further objects of this invention are to enable flow of lubricant along a rotating shaft to be prevented by means wherein stationary and rotatable parts which are out of contact with each other cooperate in controlling the flow of the lubricant; and to enable such lubricant flow to be controlled by means which are of general application, not only to railway apparatus or equipment, but also to rotating shafts generally, as for example, to crank shafts, transmission shafts and the like used in automotive vehicles, power plants, and other installations involving the production or transmission of power.

Other and further objects of the present invention will be apparent from the following description and claims and are illustrated in the accompanying drawings which, by way of illustration, show preferred embodiments and the principle thereof and what we now consider to be the best mode in which we have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a partially schematic elevational view of a pair of wheels such as are provided at one side of a truck on railway equipment and which have detecting means associated therewith of the character in which our invention may advantageously be embodied;

Fig. 2 is a sectional detail view taken substantially on the line 2—2 on Fig. 1;

Fig. 3 is an elevational view of the protecting device of the present invention that is illustrated in section in Fig. 2;

Fig. 4 is a view, similar to Fig. 2, showing a modified form of our invention;

Fig. 5 is an elevational view of the ancillary protecting device that is illustrated in section in Fig. 4;

Fig. 6 is another view similar to Fig. 2 and showing another form of our invention;

Fig. 7 is an elevational view of the ancillary protecting device that is illustrated in section in Fig. 6;

Fig. 8 is a longitudinal vertical sectional view taken along the rotative axis of the crank shaft of an internal combustion engine and illustrating still another embodiment of our invention whereby escape of lubricant from the crank case is prevented;

Figs. 9 and 10 are cross sectional views taken respectively along the lines 9—9 and 10—10 of Fig. 8;

Fig. 11 is a sectional view similar to Fig. 8 and illustrating another form of the invention as applied to the crank shaft of an internal combustion engine;

Fig. 12 is a sectional view taken along the line 12—12 of Fig. 11;

Fig. 13 is a longitudinal vertical sectional view taken along the axis of a power transmitting shaft and illustrating the application of our invention thereto; and Fig. 14 is a sectional view taken along the line 14—14 of Fig. 13.

The selected embodiments of our invention that are illustrated in Figs. 1 to 7 of the accompanying drawings are utilized in a control apparatus that is particularly adapted for use on railway equipment or the like to detect any tendency of the wheels of such equipment to slide or slip on the rails instead of normally rolling thereon, but it is to be understood that this showing is merely illustrative of a wide variety of apparatus of this character in which the invention may be embodied, and other apparatus in which the invention may be employed is shown in Figs. 8 to 14 of the drawings.

The control apparatus with which our invention is shown in Figs. 1 to 7 of the accompanying drawings is of the general character to which United States Letters Patent Nos. 2,232,751 and 2,232,752, both patented February 25, 1941, pertain. Such apparatus operates in dependence upon a principle inferred from numerous observations in practice, namely, that the wheels on separate axles of the same vehicle or truck do not maintain equal rotative speeds when a condition tending toward wheel sliding arises. Thus, where the wheels encounter a slippery portion of the rail while being decelerated in the course of a braking operation of the equipment (assuming this produces a tendency toward sliding of the wheels) it has been observed that a wheel or the wheels on the axle will start to slow down before the wheel or wheels on a companion axle. If this condition persists, then the one set of wheels may become locked and slide along the rails before the other set of wheels and while the other set are still moving. Such variation in rotative speeds of the respective wheels develops a perceptible time prior to any actual sliding of the wheels. Therefore, in order to detect a tendency toward wheel sliding before any sliding actually occurs, the rotative speeds of the wheels on two or more axles may be compared, and if an appreciable difference is detected, then a control operation, such as sanding the track or releasing or reducing the effectiveness of the brakes may be effected to thereby restore normal rolling of the wheels.

The present invention is embodied in detecting means of the character adapted for use with control apparatus of the aforesaid character described in full detail in the copending application of Rosser L. Wilson, Serial No. 426,118 filed January 9, 1942, now Patent No. 2,320,809, patented June 1, 1943.

Such detecting means includes two commutator switches which are respectively associated with the wheels whose speeds of rotation are to be compared in the manner and for the purpose explained hereinabove. Thus, referring to Fig. 1, two commutator switches S1 and S2 are respectively associated with the wheels W1 and W2 that are respectively mounted on axles as A, Fig. 2, of a truck (not shown). Each switch S1 and S2 is supported in a housing 15 which constitutes the cover of a journal box B for the respective axle A. The switches S1 and S2 are generally of identical construction and when utilized in the manner described in the aforesaid copending application, certain parts are omitted from the switch S1, but in so far as the present invention is concerned these switches may be considered as being identical since each includes parts that are to be protected against the lubricant from the housing 15 passing thereto.

As shown best in Fig. 2, the journal box cover or switch housing 15 has a generally cylindrical exterior surface on which an annular flange 16 is formed intermediate the ends of the housing. The flange 16 is secured by bolts 17 to a cooperating flange 18 on the outer face of the journal box B, a suitable gasket 19 being interposed between the flanges 16 and 18. As thus mounted, the cover 15 is concentric with respect to the axle A and extends for a short distance interiorly of the journal box B, the inner end of the cover 15 being open and terminating near the vertical plane in which the outer end of the axle A lies. Preferably a neat fit is afforded between the journal box B and the cover 15 so that the cover is accurately centered with respect to the axle A. The other portion of the cover or housing 15 extends a substantial distance beyond the free end of the journal box B and axle A. Moreover, a cylindrical boss 20 is disposed concentrically within the housing 15 and extends inwardly toward the end of the axle A but terminates in spaced relation therewith. This boss 20 serves to support various parts of the switch structure, as will be explained presently. As used in the present description, the term "inner" or "inwardly" means toward the left as viewed in Fig. 2, or toward the axle A, and "outer" or "outwardly" means toward the right as viewed in Fig. 2, or away from the axle A.

Each switch as S2 comprises a stationary portion 21, Fig. 2, referred to herein as the stator, and a cooperating rotatable portion 22, referred to herein as the rotor. These parts are made of suitable insulating material such as a synthetic resin and have embodied therein certain electrical conducting elements which are included in the control circuits of the apparatus. The rotor 22 is connected to the axle A to be driven thereby and cooperates with the stator 21 to selectively establish or interrupt the control circuits.

In the present instance, the stator 21 is disposed interiorly of the boss 20 and has a cylindrical opening extending through it for the reception of the rotor 22, which is likewise of cylindrical configuration. The stator 21 is supported by a web 23 formed on the interior wall of the boss 20. The inner face of the stator 21 is flush with the adjoining portion of the boss 20 and is engaged by the flat face of a hub-shaped retaining member 25, Fig. 2, which is secured to the boss 20 by screws 26, a gasket 27 being interposed between the member 25 and the stator 21. Thus the stator 21 is securely retained in the desired non-rotative relation within the boss 20. A plurality of commutator bars 30 of conductive material are imbedded in the insulating material of the stator 21 flush with the interior and outer end surfaces thereof and brushes mounted in the rotor 22 cooperate with these bars. The rotor 22 is mounted upon a shaft 40 which extends through the hub 41 of the retaining member 25, this hub extending inwardly from the base of the member 25 toward the end of the axle A. A ball bearing 42 carried by the retaining member 25 supports the shaft 40 in axial alignment with the axle A. To insure accurate centering of the shaft 40 relative to the axle A, an annular recess is formed in the inner end of th boss 20 to receive the retaining member 25, the rim 44, Fig. 2, of this recess fitting accurately around the periphery of the member 25. The ball bearing 42 is received in a recess within the hub of the retaining member 25 and is retained in place by a washer 49 which is seated in a shallow recess in the outer end of the retaining member 25 abutting the gasket 27 and which bears against the exterior race of the ball bearing 42 to maintain the ball bearing seated in the retaining member 25.

The shaft 40 extends inwardly from the ball bearing 42 into proximity with the outer end of the axle A, and this portion of the shaft 40 is flattened on opposite sides as indicated at 45 so that it may pass between a pair of spaced lugs 43 on a plate 46, Figs. 2 and 4, which is adapted to be secured to the end of the axle A by screws 47. The lugs 48 grip the flat surfaces 45 of the shaft 40 and cause the shaft 40 to rotate with the axle A when the vehicle is in motion. Because of the accurate interfitting of the various switch parts, the shaft 40 is maintained coaxially with respect to the axle A and hence there is no tendency to produce undue strains or wear such as might result from even a slight eccentricity of the shaft 40 in relation to the axle A.

The interior of the journal box cover 15 communicates freely with the interior of the journal box B as shown in Fig. 2, and hence a pool of lubricant in the space intermediate the boss 20 and the bottom wall of the cover 15 serves as a sump for the lubricant utilized in the journal box. Lubricant may be introduced into the interior of the journal box B and journal box cover 15, without the removal of the cover from the box, through an opening disposed a predetermined distance above the lowermost part of the cylindrical shell of the cover 15 to thereby determine the permissible height of the pool of lubricant when the vehicle is at rest. A pipe plug 50, Fig. 1, is employed to close the opening into the housing 15 after introduction therethrough of the lubricant into the journal box. If desired, an oil seal may be disposed about the shaft 40 where it enters the hub 41 of the retaining member 25, but since our invention is effective to prevent oil or other lubricant so introduced into the housing 15 from passing to the shaft 40 and thence into the circuit closing means, including the commutator bars 30, such an oil or lubricant seal need not necessarily be employed.

It will be understood that brushes 51 carried by the rotor 22 cooperate with the commutator bars 30 in such a manner that if an incipient wheel sliding condition accrues, circuit will be closed to means which are effective to prevent the accrual of an actual wheel sliding condition. Thus, certain of the brushes 51 are interconnected and suitable conductors are connected to the commutator bars 30, and these conductors are led from the switches S1 and S2 through flexible conduits 52. Desirably, these conductors lead to a plug as 53 at the free end of each conduit 52, these plugs having posts (not shown) thereon to which the conductors in the conduits are respectively connected, such posts being respectively insertable into sockets as 54 supported, for example, on the frame of the truck in which the axles as A are journaled. From the sockets as 54 the conductors are led through suitable conduit means to the devices which are effective to bring about a control operation. The manner in which the circuits closed by the cooperation of the brushes 51 with the commutator bars 30 are operative to bring about a control operation is described in detail in the above referred to copending application and, in so far as the present invention is concerned, the brushes 51 and commutator bars 30 are important since they are illustrative of means to be protected against having a lubricant pass thereto, particularly since, as will be understood, passage of the lubricant to brushes as 51 and bars as 30 might interfere with proper operation thereof.

Hence, in accordance with the present invention, in order to prevent the passage of a lubricant or the like to parts such as the brushes 51 and the bars 30, we provide what may well be called a flinger arrangement which is effective to protect parts such as the brushes 51 and bars 30 from having a lubricant pass thereto. In the form of our invention illustrated in Figs. 2 and 3, we utilize a substantially cup-shaped flinger 60 which comprises a flat annular base or bottom wall 61 and an upstanding wall or rim 62 which has an outwardly extending flange 63 about the free edge thereof. The wall 62 has two spaced apart openings 64 therein which are spaced apart similarly to the spacing apart of the openings in the plate 46 through which the bolts 47 are passed. Moreover, the plate 61 is so sized and the wall 62 is of such height that flange 63 at the free edge thereof will be disposed adjacent to the free edge of the rim 44 on the boss 20 when the flinger 60 is installed in position, the free edge of the flange 63, as best shown in Fig. 2, desirably being disposed to extend beyond the outer periphery of the rim 44. When the flinger 60 is to be utilized, the outer face of the bottom 61 thereof is disposed against the adjacent free end of an axle as A and thereafter the plate as 46 is disposed within the flinger. The bolts as 47 are then passed through openings in the plate 46 aligned with openings 64 in the bottom 61, and these bolts are then threaded into tapped openings in the adjacent end of the axle whereupon the plate 46 and the flinger 60 are securely fast in position as shown in Fig. 2.

Thus the flinger 60 is disposed about the shaft as 40 and as this flinger rotates with the axle as A any oil or lubricant that collects on the periphery thereof is thrown therefrom, and by reason of the flange 63 about the free edge thereof the lubricant is prevented from having access to the narrow space between adjacent faces of the flange 63 and the rim 44, wherefore lubricant does not pass through the shaft 40. By reason of the fact that the flange 63 projects beyond the periphery of the rim 44 and therefore the boss 20 and since the face of the flange 63 is disposed in juxtaposition to the free edge of the rim 44 and since the centrifugal effect of the rim 63 forces oil outwardly, any oil that passes to the periphery of the boss 20 is prevented from passing to the shaft 40.

The foregoing prevails so long as the axle A and flinger 60 are in motion but when these parts come to rest, oil that has collected on the periphery of the boss 20, and particularly on the upwardly disposed part of this periphery, may flow through the space between adjacent faces of the flange 63 and rim 44. However, any oil which does flow through this space will flow over the face of the retainer 25 and the hub 41 thereof to the groove 65 formed in the periphery of this hub in juxtaposition to the free end thereof. The groove 65 is disposed and so sized that any oil which does flow thereto will flow therethrough to the lower part thereof to then pass into the interior of the flinger 60. The oil will then flow along the inner face of the lower part of the wall 62 of the flinger to drain out through the space between adjacent faces of the flange 63 and rim 44 at the lower parts thereof. If desired, and in order to insure such drainage from the wall 62, this wall may be slightly inclined toward the free end thereof although in actual use of the flinger it has been found that this is not essential.

As a further means of insuring that any oil which may pass between adjacent faces of the flange 63 and rim 44 will be prevented from passing to the shaft as 40, what may well be called an ancillary protecting device may be utilized, an arrangement of this character being illustrated in Fig. 4. Inasmuch as the parts disclosed in Fig. 4 fully correspond to those illustrated in for example Fig. 2, similar reference characters are applied to the various parts in Figs. 2 and 4. However, an annular plate 66, Figs. 4 and 5, is provided which has an opening therein sized to neatly accommodate the hub 41 of the retainer 25, the diameter of the plate 66 being such that when this plate is disposed on the hub 41, as shown in Fig. 4, the periphery of the plate will be slightly spaced from the inner face of the wall 62 of the flinger 60. The plate 66 is fast to a ring 67 in any suitable manner, as by being welded thereto, and this ring is adapted to fit over the periphery of the hub 41 adjacent to the free end thereof so that the bolt 68 passed therethrough may pass into the groove 65 to thereby fasten the ring 67 and plate 66 to the retainer 25.

It will be manifest that any oil that may flow through the space between adjacent faces of the flange 63 and rim 44 will flow to the plate 66 and since this plate closely fits onto the periphery of the hub 41, the oil will be deflected away from the shaft as 40 to be drained from the flinger 60 in the manner in which oil flowing to the groove 65 is to be drained therefrom, this having been explained hereinabove.

Yet another arrangement effective to insure against passage of lubricant to a shaft as 40 and the parts associated therewith that are to be protected against having a lubricant come into contact therewith is illustrated in Figs. 6 and 7 wherein a sleeve 70 is utilized and which is so sized in diameter as to neatly embrace the hub 41 of the retainer 25, this sleeve being of such length that when one end thereof is engaged with the adjacent face of the retainer 25 the opposite end thereof projects well beyond the free end of the hub 41 to be terminated in spaced relation with the bolts 47 effective to secure the plate 46 and the bottom 61 to the adjacent end of the axle A. The sleeve 70 has an outwardly extending flange 71 formed thereon at the end thereof disposed adjacent to the heads of the bolts 47. In order to prevent displacement of the sleeve 70 from the hub 41, bolts 72 are passed through this sleeve and into the groove 65 formed in the hub 41, and in this respect it will be understood that except in so far as the sleeve 70 is concerned various parts illustrated in Fig. 6 fully correspond to those illustrated in Figs. 2 and 4 and therefore reference characters such as are applied to the various elements in Figs. 2 and 4 are also applied to the elements where these appear in Fig. 6.

Here again any oil that may flow through the space between adjacent faces of the flange 63 and rim 44 will flow to the periphery of the sleeve 70, and inasmuch as one end of this sleeve tightly fits against the adjacent end of the retainer 45 and since the flange 71 is provided at the opposite end of this sleeve any oil that passes to the sleeve will flow thereover and drain therefrom at the lower edge thereof to pass out between the lower parts of adjacent faces of the flange 63 and rim 44.

While in the embodiments of the invention disclosed in Figs. 1 to 7, the invention has been disclosed as a means for protecting the electrical structure of a control apparatus associated with an axle of railway or like equipment, it is clear that the invention is also well suited for association with other apparatus such as an internal combustion engine 80 shown fragmentally in Figs.

8 to 10 of the drawings. As there shown a crankshaft 81 is supported in the crankcase 82 formed by and between the cylinder block 83 and the separably related pan 84 by means including a separable or cap type main bearing 85, and the arrangement is such that the power output end 86 of the crankshaft 81 extends outwardly in the form of a stub shaft through an opening 87 in an end wall 88 of the crankcase 82.

In the construction thus described the end wall 88 is spaced a substantial distance from the main bearing 85 to thereby afford a recess or chamber 89 within which means is provided in accordance with this invention for preventing passage of oil from the crankcase 82 along the stub shaft 86 of the crankshaft. For this purpose a flinger 90 is mounted on the stub shaft 86, the flinger 90 being of a two-piece or split construction so that the two parts thereof meet in the line of separation 91 as shown in Fig. 9. The flinger 90 includes a mounting sleeve 92 which embraces the stub shaft 86 and the two separable portions of the mounting sleeve 92 are clamped upon the stub shaft 96 by means such as bolts 93 extended through outwardly projecting lugs 94. The mounting sleeve 92 has an outwardly projecting disc portion 95 formed integrally therewith and from the outer edge of the disc portion, a cylindrical wall portion 96 extends in a direction away from the mounting sleeve 92. At the end which is remote from the disc 95 the cylindrical wall portion 96 has an outwardly extending annular flange 97 which corresponds in most respects with the form and function of the flange 63 formed on the flinger 60 shown in Fig. 2.

The flinger 90 is clamped on the stub shaft 96 by the clamping bolts 93 in such a position that the flat face of the flange 97 is disposed relatively close to the inner face 99 of the wall 88, and hence, when the shaft 96 and the flinger 90 are rotating, the flange 97 of the finger cooperates with stationary wall 88 in throwing in an outward direction any oil which may tend to run along the inner surface 99 of the wall 88. When the shaft 86 is rotating this cooperative action is sufficient to prevent oil from reaching the shaft 86 adjacent to the opening 87, but as hereinbefore pointed out, the present invention also contemplates and makes provision for control of the flow of oil during those periods when the shaft 86 is at rest. To this end therefore an additional protecting means in the form of a sleeve 100 is disposed within the annular clearance space afforded between the cylindrical wall portion 96 and the shaft 86. As shown in Figs. 8 and 10, the sleeve 100 is of a two-part construction and is separable along a line 101 which is preferably disposed in a horizontal location. The sleeve 100 has an inwardly extended flange 102 which abuts against the inner face 99 of the wall 88 to thereby serve as a mounting means, and the upper and lower sections of the sleeve 100 are held in place on the wall 88 by means such as bolts 103. At the end which is remote from the mounting flange 102, the sleeve 100 has an outwardly extended flange 105 which in the form herein shown is disposed relatively close to the face of the disc portion 95 of the flinger 90. It will also be observed that the flange 105 extends outwardly so as to be relatively close to the inner cylindrical surface of the cylindrical wall portion 96 of the flinger. With this construction it will be evident that when the shaft 96 is at rest, any oil which flows downwardly along the wall 88 and past the flange 97 will drain in one direction or the other along the top of the upper section of the sleeve 100, and such oil will be drained downwardly so as to be deposited on the inner surface of the cylindrical portion 96 of the flinger 90. From this location the oil will of course drain downwardly along the flange 97 of the flinger and into the main body of oil contained in the crankcase below the lower level of the flange 97.

The arrangement disclosed in Figs. 8 to 10 is such that the flinger 90 and the associated sleeve 100 are housed within the crankcase 82, but in accordance with the embodiment of the invention disclosed in Figs. 11 and 12 of the drawings a similar oil retaining means may be mounted exteriorly of the crankcase. In this embodiment of the invention, the crankcase 82, the cylinder block 83 and the pan 84 are formed in the same manner as hereinbefore described in connection with Fig. 8 and corresponding reference numerals are therefore employed for these elements as well as the other elements of the engine. In this embodiment of the invention, however, the stub shaft 86' which projects through the opening 87 and wall 88 is somewhat longer than the stub shaft 86, thereby to afford an additional length of shaft outside of the wall 88, and to inclose the oil retaining means, a housing 110 is mounted about the shaft 86' outside of the wall 88. This is accomplished by means such as cap screws 111 extending through a flange 112 of the housing 110, these cap screws extending into the wall 88. The housing 110 is arranged to form a chamber 113 about the shaft 86' and outside of the wall 88, and a flinger 114 is mounted on the shaft 86' within the chamber 113 so as to rotate with the shaft 86'. The flinger 114 is formed in one piece and of generally cup-shaped form to provide a mounting sleeve 115 of cylindrical form which may be associated with the shaft 86' by means of a press fit. A disc portion 116 extends outwardly from one end of the mounting sleeve 115 and a cylindrical portion 117 extends longitudinally from the outer edge of the disc portion 116 in a direction opposite from the mounting sleeve 115. At the edge of the cylindrical portion 117 which is opposite from the disc portion 116 an outwardly extending flange 118 is provided for the accomplishment of the same functions as the flange 63 of Fig. 2, and the end surface of the flange 118 is disposed relatively close to the inner surface of an end wall 119 of the housing 110, the wall 119 being disposed parallel to the wall 88 of the crankcase. With this arrangement the rotating flange 118 cooperates with stationary wall 119 in discharging oil outwardly away from the shaft 86' and such discharged oil strikes the inner surface of the housing 110 so as to flow downwardly into the lower end or portion of the chamber 113 where such oil collects.

To prevent oil from running downwardly along the wall 119 and into contact with the shaft 86' a sleeve 120 is mounted within the cylindrical portion 117 of the flinger and on the stationary end wall 119. The sleeve 120 is generally similar to the sleeve 100 but in the present instance the sleeve 120 may be made in one piece since it is mounted with the removable housing 110. The sleeve 120 has an inwardly extending mounting flange 121 which is held in place on the end wall 119 by cap screws 122, and at the other end of the sleeve 120 an outwardly extending flange 123 is provided. The form of the flange 123 and its relation to the flinger 114 are similar to the form and relation of the flange 105. With this arrangement any oil which drains downwardly along the wall 119 strikes the top of the sleeve 120 is drained downwardly and off the flange 123 on to the internal surface of the flinger 114. Thus the construction shown in Fig. 11 prevents flow of oil along the shaft 86' and away from the crankcase, whether the shaft is in rotation or is at rest.

In Figs. 13 and 14 of the drawings the invention illustrated as applied to a power transmission shaft 130 which extends through the side wall 131 of a tank or reservoir 132 in which a lubricant or other liquid 133 is contained. The transmission shaft 130 has a driving element such as a gear 134 on its outer end, and the shaft 130 is supported by a sleeve bearing 135 carried on the wall 131. The bearing 135 is, in the present instance, formed integrally on a mounting plate 136 which is secured by bolts 137 in closing relation to a relatively large opening 138 in the side wall 131. It will be evident that the liquid 133 might in many instances tend to pass along the shaft 130 and through the bearing 135, but in accordance with the present invention means are associated with the shaft 130 within the container 132 to prevent such flow of oil or other liquid along the shaft and through the bearing 135. To this end a flinger 140 is mounted as by a press fit upon the shaft 130 for rotation therewith, the flinger 140 being of cup-shaped form and including a mounting sleeve 141, an outwardly projecting disc like portion 142, a cylindrical wall portion 143, and an outwardly projecting flange 144 which are formed and related in substantially the same manner as the elements of the flinger 114 of Fig. 11. The flange 144 is arranged so as to be disposed relatively close to the inner face of the mounting plate 136, it being noted that the opening 138 is of a size sufficient to provide ample clearance about the periphery of the flange 144 when the flinger 140 is moved into position. With this construction the liquid which moves toward the bearing 135 is thrown radially outwardly so as to drain downwardly along the inner face of the mounting plate 136.

In this embodiment of the invention an additional protecting means is afforded by a sleeve 146 which has an inwardly extending mounting flange 147 at one end secured to the inner face of the mounting plate 136 by cap screws 148. At its other end the sleeve 146 has an outwardly extending flange 149 which is disposed relatively close to the disc portion 142 of the flinger 140. Thus, with this construction, any oil or liquid which runs down the inner surface of the plate 136 will drain off of the top of the sleeve 146 and onto the inner surface of the flinger, and will thereafter drain out of the flinger into the main body of liquid or oil 133.

We have shown the fingers, as 60, 90, 114 and 140, as being formed in each instance from a single piece of material but it will be understood that, for example, the outward flanges may be made as a separate part and joined to the cylindrical wall in a suitable manner as by welding. Moreover, if desired, mounting walls or flanges may be made as separate pieces and suitably joined to the cylindrical walls without departing from the ambit of our invention. Likewise, while we have shown the plate 66 and rim 67 as being separate elements, these might be made in one piece should this be desired. Yet further while we have shown the sleeve 70 and flange 71 thereon as being integral, it will be understood that these parts might be formed of separate elements and joined together in a suitable manner as by welding, and that a similar manner of formation might be employed in respect to the elements of the protecting sleeves 100, 120 and 146.

It will be manifest from the foregoing description that we have provided an arrangement which will effectively prevent a lubricant from passing along a rotating shaft to those parts which are to be protected against lubricant. The protective oil and grease retainer of this invention is of such nature that it will be effective either when the apparatus of which it is a part is in motion or is at rest and it is by reason of this that we are able to effectively retain and prevent undesired flow of oil and grease along a rotating shaft in situations where adequate and satisfactory control has heretofore been unattainable.

While we have illustrated and described selected embodiments of our invention, it is to be understood that these are capable of variation and modification and we therefore do not wish to be limited to the precise details set forth, but desire to avail ourselves of such changes and alterations as fall within the purview of the following claims.

We claim:

1. A device of the class described including a housing provided at the outer side with an inwardly extending cylindrical boss provided at its end with an annular recess forming a projecting rim, a hub-shaped retaining member seated in the annular recess of said boss and surrounded by the projecting rim thereof and having a projecting hub, a rotatable shaft located wholly within the housing and extending through the hub-shaped member and provided at its inner end with flattened surfaces, a rotatabe plate having spaced projecting lugs gripping the flattened surfaces of said shaft, a substantially cup-shaped lubricant deflecting member enclosing said plate and the adjacent portion of said shaft and provided with a peripheral flange arranged closely adjacent to said rim and cooperating with the same to form a lubricant seal.

2. A device of the class described including a housing provided at its outer end with an inwardly extending annular boss provided at its end with an annular recess forming a projecting rim, a hub-shaped retaining member seated in the annular recess of said boss and surrounded by the rim thereof and provided with a projecting hub having an annular groove, a shaft located wholly within the housing and extending through the hub-shaped member and having at its inner end flattened surfaces, a rotating plate having spaced lugs receiving the inner end of said shaft and gripping the flattened surfaces thereof, a substantially cup-shaped lubricant deflecting member enclosing said plate and the adjacent portion of said shaft and provided with a peripheral flange arranged closely adjacent said rim and cooperating therewith to form a lubricant seal, an annular plate having a circular opening fitting the projecting hub of the retaining member and having its periphery spaced slightly from the interior surface of the cup-shaped member, and a ring fixed to the annular plate and fitting over said hub and provided with fastening means projecting into said annular groove and retaining the annular plate on the hub.

LYALL R. FISH.
CLARENCE F. WIEGMAN.